United States Patent
Lyons

(10) Patent No.: US 6,646,077 B1
(45) Date of Patent: Nov. 11, 2003

(54) PEROXIDE CURABLE FLUOROELASTOMERS

(75) Inventor: Donald Frederick Lyons, Wilmington, DE (US)

(73) Assignee: DuPont Dow Elastomers LLC, Wilmington, DE (US)

( * ) Notice: Subject to any disclaimer, the term of this patent is extended or adjusted under 35 U.S.C. 154(b) by 0 days.

(21) Appl. No.: 10/193,435

(22) Filed: Jul. 11, 2002

(51) Int. Cl.⁷ ............................................. C08F 214/22
(52) U.S. Cl. ............................. 526/206; 526/78; 526/87; 526/247; 526/249; 526/250; 526/255; 526/296
(58) Field of Search ...................... 526/206, 87, 78, 526/249, 247, 255

(56) References Cited

U.S. PATENT DOCUMENTS

| | | |
|---|---|---|
| 3,839,305 A | * 10/1974 | Moore |
| 4,243,770 A | 1/1981 | Tatemoto et al. |
| 4,529,759 A | 7/1985 | Ojakaar |
| 4,694,045 A | 9/1987 | Moore |
| 5,151,492 A | 9/1992 | Abe et al. |
| 5,214,106 A | 5/1993 | Carlson et al. |
| 5,225,504 A | 7/1993 | Tatsu et al. |
| 5,585,449 A | 12/1996 | Arcella et al. |
| 5,625,019 A | 4/1997 | Arcella et al. |
| 5,717,036 A | 2/1998 | Saito et al. |
| 5,898,054 A | 4/1999 | Saito et al. |

FOREIGN PATENT DOCUMENTS

EP  171290 A2  2/1986

* cited by examiner

Primary Examiner—Fred Zitomer

(57) ABSTRACT

Peroxide curable fluoroelastomers having copolymerized units of vinylidene fluoride or tetrafluoroethylene major monomer, at least one other fluorinated major monomer, a cure site monomer having the general formula $CH_2=CH-(CF_2)_nI$, where n is an integer between 2 and 8, and iodine bound at the terminal positions of polymer chains, process well and have excellent tensile properties.

7 Claims, No Drawings

PEROXIDE CURABLE FLUOROELASTOMERS

FIELD OF THE INVENTION

This invention pertains to peroxide curable fluoroelastomers comprising copolymerized units of vinylidene fluoride or tetrafluoroethylene, at least one other fluorinated major monomer, and a cure site monomer having the general formula $CH_2=CH-(CF_2)_nI$, where n is an integer between 2 and 8, and wherein said fluoroelastomer has iodine atoms at chain ends.

BACKGROUND OF THE INVENTION

Fluoroelastomers having excellent heat resistance, oil resistance, and chemical resistance have been used widely for sealing materials, containers and hoses. Examples of fluoroelastomers include copolymers comprising units of vinylidene fluoride ($VF_2$) and units of at least one other copolymerizable fluorine-containing major monomer such as hexafluoropropylene (HFP), tetrafluoroethylene (TFE), chlorotrifluoroethylene (CTFE), vinyl fluoride (VF), and a fluorovinyl ether such as a perfluoro(alkyl vinyl ether) (PAVE). Specific examples of PAVE include perfluoro (methyl vinyl ether), perfluoro(ethyl vinyl ether) and perfluoro(propyl vinyl ether). Other examples of fluoroelastomers include the copolymers of tetrafluoroethylene with a perfluoro(alkyl vinyl ether) such as perfluoro(methyl vinyl ether) (PMVE).

In order to develop the physical properties necessary for most end use applications, fluoroelastomers must be crosslinked. A preferred curing system for many end uses is the combination of an organic peroxide and a multifunctional unsaturated coagent. The coagent forms crosslinks by reacting with cure sites on the fluoroelastomer polymer chain. A preferred cure site is an iodine atom bonded to a carbon atom on the fluoroelastomer chain.

The major challenge with the use of iodine-containing cure sites in fluoroelastomers is to balance sufficient heat resistance with acceptable processability and rheology. Sufficient heat resistance is conferred by synthesizing polymers with an average minimum of 2.5 iodine atoms per chain. Fewer than an average of 2.5 iodine atoms per polymer chain results in destruction of crosslink sites during heat aging, leading to excessive amounts of dangling polymer chains that do not contribute to network strength and weaken the tensile strength of the cured article (Flory, P. J. *Principles of Polymer Chemistry*, p 432, Cornell University Press, 1952).

One method of introducing iodine cure sites into the fluoroelastomer is by conducting the polymerization in the presence of a chain transfer agent containing iodine. In this manner, an iodine atom is attached to the resulting fluoroelastomer polymer chain at one or both terminal positions. Such chain transfer agents typically have the formula $RI_n$, where R may be a $C_1$–$C_3$ hydrocarbon, a $C_1$–$C_6$ fluorohydrocarbon or chlorofluorohydrocarbon, or a $C_2$–$C_8$ perfluorocarbon, and n is 1 or 2 (U.S. Pat. No. 4,243,770). However, use of an iodine-containing chain transfer agent alone in a fluoroelastomer polymerization will inevitably give rise to polymer chains containing less than two iodine atoms per chain. Therefore fluoroelastomers produced using this process have insufficient heat resistance for many applications.

A solution to this difficulty is to use large amounts of iodine-containing chain transfer agents together with monomers containing two olefin moieties (U.S. Pat. No. 5,585,449). The use of the diolefin-containing monomers crosslinks 2 short polymer chains during polymerization to give one larger chain that contains at least an average of 2.5 iodine atoms. However, the resulting polymer is branched and may show poor rheology and flow properties.

Another common method of introducing iodine atom cure sites onto a fluoroelastomer polymer chain is by copolymerizing a minor amount of an iodine-containing fluoroolefin or fluorovinyl ether cure site monomer along with the major monomers (e.g. $VF_2$, HFP, TFE, PAVE, etc.). In this manner, cure sites may be randomly distributed along the resulting fluoroelastomer polymer chain (U.S. Pat. Nos. 4,529,759; 4,694,045). However, each iodine-containing cure site monomer that is introduced in this way itself acts as a chain transfer agent. During polymerization, these sites will serve as branch points. The resulting fluoroelastomers may be highly branched and show unacceptably poor rheology. In many cases the resulting fluoroelastomer will be branched to such a degree as to display insoluble gel (EP-A-0171290). While such polymers will display excellent physical properties such as compression set, their poor flow behavior precludes them from practical use and their gel content causes poor hot tear strength and poor demolding.

In addition, while iodine cure sites may be introduced both along the fluoroelastomer polymer chain and at terminal positions by a combination of the above methods (EP-A-0171290; and U.S. Pat. No. 5,717,036), a highly branched polymer may similarly be obtained, albeit with lower overall molecular weight. In particular, the fluoroelastomer molecular weight may be too low to displace trapped air during compression molding or may lead to mold fouling, poor tensile strength, or poor compression set.

Arcella et al. (U.S. Pat. No. 5,625,019) attempt to address this problem by use of a cure site in which the iodine is attached to a short length of hydrocarbon chain. In this case the cure site monomer does not serve as an active chain transfer agent during polymerization. However, during curing the reactivity of a —$CH_2CH_2I$ site is less than that of a —$CF_2CF_2I$ site and cure times are longer. In addition, the presence of a —$CH_2CH_2I$ group during polymerization is highly retarding and excessive amounts of polymerization initiator are required in order to maintain a desirable polymerization rate.

Therefore it remains a general problem in the field of fluoroelastomers to provide a polymer that has high molecular weight, low or no branching, and contains sufficient iodine cure sites to confer adequate heat resistance.

A secondary problem in the field of fluoroelastomers is the use of monomers of the formula $CH_2=CH-(CF_2)_nI$ (n=2 to 10) as cure sites. These monomers are easily prepared as described in J. Org. Chem. 42,1985–90 (1977) and are therefore of interest as a cure site monomer. But as described in EP-A-0171290, their use in a continuous polymerization process leads to highly branched products and their use in a batch polymerization process leads to a non-uniform distribution along the polymer backbone and consequently poor physical properties. Another difficulty when using this class of cure site monomers in a batch process is that they are so highly retarding that polymerization times are prolonged to undesirable lengths.

SUMMARY OF THE INVENTION

In one aspect, the present invention provides a peroxide curable fluoroelastomer having excellent processability and wherein the cured fluoroelastomer has excellent tensile properties. The fluoroelastomer comprises copolymerized units of (A) a first fluoromonomer selected from the group consisting of vinylidene fluoride and tetrafluoroethylene;

(B) at least one second fluoromonomer, different from said first fluoromonomer;

(C) 0.05 to 4 weight percent, based on total weight of said fluoroelastomer, of a cure site monomer having the general formula $CH_2=CH-(CF_2)_nI$, where n is an integer between 2 and 8; and (D) 0.01 to 1 weight percent, based on total weight of said fluoroelastomer, of iodine bound at terminal positions of fluoroelastomer polymer chains.

Another aspect of the present invention is a curable fluoroelastomer composition comprising:

(A) the above fluoroelastomer;

(B) an organic peroxide; and (C) a coagent.

Another aspect of the present invention is a semibatch polymerization process for the manufacture of the above fluoroelastomer comprising:

(A) charging a reactor with a quantity of an aqueous solution comprising a surfactant;

(B) feeding to said reactor a quantity of an initial major monomer mixture to form a reaction medium, said initial major monomer mixture comprising i) from 10 to 70 weight percent, based on total weight of said monomer mixture, of a first monomer, said first monomer selected from the group consisting of vinylidene fluoride and tetrafluoroethylene, and ii) between 75 and 30 weight percent, based on total weight of said monomer mixture, of one or more additional copolymerizable monomers, different from said first monomer, wherein said additional monomer is selected from the group consisting of fluorine-containing olefins, fluorine-containing ethers, and mixtures thereof;

(C) polymerizing said monomers in the presence of a free radical initiator to form a fluoroelastomer dispersion while maintaining said reaction medium at a pH between 1 and 7, at a pressure between 0.5 and 10 MPa, and at a temperature between 25° C. and 130° C.; and (D) feeding to said reactor a quantity of an incremental major monomer mixture to maintain constant pressure in said reactor, said incremental major monomer mixture comprising i) from 20 to 70 weight percent, based on total weight of said monomer mixture, of a first monomer, said first monomer selected from the group consisting of vinylidene fluoride and tetrafluoroethylene, and ii) between 80 and 30 weight percent, based on total weight of said monomer mixture, of one or more additional copolymerizable monomers, different from said first monomer, wherein said additional monomer is selected from the group consisting of fluorine-containing olefins, fluorine-containing ethers, and mixtures thereof; wherein, at a time between when 0% and 50% of said quantity of incremental major monomer mixture has been fed to said reactor, addition of a quantity of a chain transfer agent to said reactor is begun, said chain transfer agent having a formula $RI_x$, where R is a perfluoroalkyl group containing 3 to 10 carbon atoms and x is 1 or 2, and wherein at a time between when 10% and 90% of said quantity of incremental major monomer mixture has been fed to said reactor, addition of a quantity of a cure site monomer to said reactor is begun, said cure site monomer having the general formula $CH_2=CH-(CF_2)_nI$, where n is an integer between 2 and 8.

DETAILED DESCRIPTION OF THE INVENTION

The present invention is directed to peroxide curable fluoroelastomers which have excellent processability and tensile properties. The fluoroelastomers mold and de-mold well with very little, if any, sticking or mold fouling.

The fluoroelastomers of this invention comprise copolymerized units of a first major monomer which may be vinylidene fluoride ($VF_2$) or tetrafluoroethylene (TFE) and one or more additional major monomers, different from said first monomer, selected from the group consisting of fluorine-containing olefins, fluorine-containing ethers and mixtures thereof. Preferably, the fluoroelastomers contain between 20 and 70 weight percent, based on the weight of the fluoroelastomer, of a first monomer and between 80 and 30 weight percent, total, of one or more additional major monomers. By "major monomer" is meant a monomer, other than a cure site monomer, that forms copolymerized units that make up the backbone of the fluoroelastomer polymer chain.

According to the present invention, fluorine-containing olefins copolymerizable with the first monomer include, but are not limited to, vinylidene fluoride, hexafluoropropylene (HFP), tetrafluoroethylene (TFE), 1,2,3,3,3-pentafluoropropene (1-HPFP), chlorotrifluoroethylene (CTFE) and vinyl fluoride.

The fluorine-containing ethers employed in the present invention include, but are not limited to perfluoro(alkyl vinyl ethers), perfluoro(alkyl alkenyl ethers) and perfluoro(alkoxy alkenylethers).

Perfluoro(alkyl vinyl ethers) (PAVE) suitable for use as monomers include those of the formula

  (I)

$$CF_2=CFO(R_fO)_n(R_{f'}O)_mR_{f''}$$

where $R_f$ and $R_{f'}$ are different linear or branched perfluoroalkylene groups of 2–6 carbon atoms, m and n are independently 0–10, and $R_{f''}$ is a perfluoroalkyl group of 1–6 carbon atoms.

A preferred class of perfluoro(alkyl vinyl ethers) includes compositions of the formula

  (II)

$$CF_2=CFO(CF_2CFXO)_nR_f$$

where X is F or $CF_3$, n is 0–5, and $R_f$ is a perfluoroalkyl group of 1–6 carbon atoms.

A most preferred class of perfluoro(alkyl vinyl ethers) includes those ethers wherein n is 0 or 1 and $R_f$ contains 1–3 carbon atoms. Examples of such perfluorinated ethers include perfluoro(methyl vinyl ether) (PMVE) and perfluoro(propyl vinyl ether) (PPVE). Other useful monomers include compounds of the formula

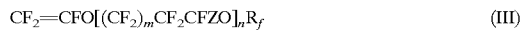  (III)

$$CF_2=CFO[(CF_2)_mCF_2CFZO]_nR_f$$

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1.

Additional perfluoro(alkyl vinyl ether) monomers include compounds of the formula $$CF_2=CFO[(CF_2CF\{CF_3\}O)_n(CF_2CF_2CF_2O)_m(CF_2)_p]C_xF_{2x+1}$$  (IV)

where m and n independently=0–10, p=0–3, and x=1–5.

Preferred members of this class include compounds where n=0–1, m=0–1, and x=1.

Other examples of useful perfluoro(alkyl vinyl ethers) include $$CF_2=CFOCF_2CF(CF_3)O(CF_2O)_m C_n F_{2n+1} \qquad (V)$$

where n=1–5, m=1–3, and where, preferably, n=1.

Perfluoro(alkyl alkenyl ethers) suitable for use as monomers include those of the formula VI $$R_f O(CF_2)_n CF=CF_2 \qquad (VI)$$

where $R_f$ is a perfluorinated linear or branched aliphatic group containing 1–20, preferably 1–10, and most preferably 1–4 carbon atoms and n is an integer between 1 and 4. Specific examples include, but are not limited to perfluoro (propoxyallyl ether) and perfluoro(propoxybutenyl ether).

Perfluoro(alkoxy alkenyl ethers) differ from perfluoro (alkyl alkenyl ethers) in that $R_f$ in formula VI contains at least one oxygen atom in the aliphatic chain. A specific example includes, but is not limited to perfluoro (methoxyethoxyallyl ether).

If copolymerized units of a fluorine-containing ether are present in the fluoroelastomers of the invention, the ether unit content generally ranges from 25 to 75 weight percent, based on the total weight of the fluoroelastomer. If perfluoro (methyl vinyl) ether is used, then the fluoroelastomer preferably contains between 30 and 55 wt. % copolymerized PMVE units.

The fluoroelastomers of the present invention also contain copolymerized units of a cure site monomer of the general formula $CH_2=CH-(CF_2)_n I$, where n is an integer between 2 and 8. Preferably, n is 2 and the cure site monomer is 4-iodo-3,3,4,4-tetrafluorobutene-1 (ITFB). Units of cure site monomer are typically present in fluoroelastomers at a level of 0.05 to 4 wt. %, preferably 0.1 to 2 wt. % and most preferably between 0.2 and 1 wt %.

Additionally, iodine-containing endgroups are present at one or both of the fluoroelastomer polymer chain ends as a result of the use of chain transfer or molecular weight regulating agents during preparation of the fluoroelastomers. The amount of chain transfer agent is calculated to result in an iodine level (not including iodine from the cure site monomer) in the fluoroelastomer in the range of 0.005 to 2 wt. %, preferably 0.05 to 1 wt. %, most preferably 0.075 to 0.5 wt. %.

The chain transfer agent is of the formula $RI_x$ where R is a perfluoroalkyl or a chloroperfluoroalkyl group having 3 to 10 carbon atoms and x is 1 or 2. The chain transfer agent employed may actually be a mixture of compounds having the latter general formula. Specific examples include, but are not limited to 1,3-diiodoperfluoropropane; 1,4-diiodoperfluorobutane; 1,6-diiodoperfluorohexane; 1,8-diiodoperfluorooctane; 1,10-diiodoperfluorodecane; and monoiodoperfluorobutane. Other chain transfer agents such as those of formula $RBr_n I_m$ (R is as defined above; n and m each are 1 or 2) may also be used. Particularly preferred are diiodinated perfluoroalkane chain transfer agents and mixtures thereof.

Specific examples of preferred fluoroelastomers of this invention include fluoroelastomers comprising copolymerized units of i) 30 to 60 wt. % $VF_2$/15 to 30 wt. % TFE/25 to 45 wt. % HFP/0.1 to 0.4 wt. % ITFB and 0.05 to 0.40 wt. % I at chain ends; ii) 20 to 65 wt. % $VF_2$/5 to 30 wt. % TFE/30 to 45 wt. % PMVE/0.1 to 0.4 wt. % ITFB and 0.05 to 0.40 wt. % I at chain ends; and iii) 44 to 60 wt. % TFE/39 to 55 wt. % PMVE/0.1 to 0.4 wt. % ITFB and 0.05 to 0.40 wt. % I at chain ends.

The fluoroelastomers of this invention have a minimum number average molecular weight (Mn) of 70,000 and very little, if any, branching. Branching causes gel, a high molecular weight, insoluble portion of a fluoroelastomer gum. Thus, the relative amount of branching in a polymer may be determined by measuring the weight percent (based on total weight of fluoroelastomer) of undissolved solids (i.e. gel) remaining from an otherwise dissolved fluoroelastomer. An appropriate solvent for the vinylidene fluoride-containing fluoroelastomers of this invention is methyl ethyl ketone. Fluorinert™ FC-77 (available from 3M) may be used for the TFE/PMVE fluoroelastomers of this invention. A 1 wt. % dispersion of fluoroelastomer in solvent is allowed to sit overnight at room temperature. The dispersion is then separated by filtration or centrifugation and the solids measured directly by weighing, or indirectly by first determining the amount of dissolved fluoroelastomer in the filtrate or supernatant (U.S. Pat. No. 4,320,216). The fluoroelastomers of this invention contain less than 5 wt. % gel, preferably less than 2 wt. % gel, most preferably less than 1 wt. % gel. Due to such low gel levels, the fluoroelastomers of this invention have excellent hot tear strength and are easily removed from molds.

In the semi-batch emulsion polymerization process of this invention, a gaseous major monomer mixture of a desired composition (initial major monomer charge) is introduced into a reactor which contains an aqueous solution. The reactor is typically not completely filled with the aqueous solution, so that a vapor space remains. The aqueous solution comprises a fluorosurfactant dispersing agent such as ammonium perfluorooctanoate, Zonyl® FS-62 (available from DuPont) or Forafac® 1033D (available from Atofina). Optionally, the aqueous solution may contain a pH buffer, such as a phosphate or acetate buffer for controlling the pH of the polymerization reaction. Instead of a buffer, a base, such as NaOH may be used to control pH. Generally, pH is controlled to between 1 and 7 (preferably 3–7), depending upon the type of fluoroelastomer being made. Alternatively, or additionally, pH buffer or base may be added to the reactor at various times throughout the polymerization reaction, either alone or in combination with other ingredients such as polymerization initiator, liquid cure site monomer or chain transfer agent. Also optionally, the initial aqueous solution may contain a water-soluble inorganic peroxide polymerization initiator such as ammonium persulfate (or other persulfate salt), or the combination of an inorganic peroxide and a reducing agent such as the combination of ammonium persulfate and sodium sulfite.

The initial monomer charge contains a quantity of a first major monomer of either TFE or $VF_2$ and one or more additional major monomers which are different from the first monomer. The amount of major monomer mixture contained in the initial charge is set so as to result in a reactor pressure between 0.5 and 10 MPa (preferably between 0.5 and 3.5 MPa). In the initial gaseous monomer charge, the relative amount of each monomer is dictated by reaction kinetics and is set so as to result in a fluoroelastomer having the desired ratio of copolymerized monomer units (i.e. very slow reacting monomers must be present in a higher amount relative to the other monomers than is desired in the composition of the fluoroelastomer to be produced).

The major monomer mixture is dispersed in the aqueous medium and a chain transfer agent may also be introduced at this point while the reaction mixture is agitated, typically by mechanical stirring. Alternatively, the chain transfer agent may be introduced at any point up to when 50% (preferably prior to 20%) of the total amount of incremental major monomer mixture (as defined hereinafter) has been fed to the reactor. The entire amount of chain transfer agent may be added at one time, or addition may be spread out over time, up to the point when 100% of the incremental major monomer mixture has been added to the reactor. Most preferably, the chain transfer agent is introduced to the reactor before polymerization begins, or shortly thereafter, and the entire amount of chain transfer agent is fed to the reactor by the time that 5% of the total amount of incremental major monomer mixture has been fed to the reactor.

The temperature of the semi-batch reaction mixture is maintained in the range of 25° C.–130° C., preferably 30° C.–90° C. Polymerization begins when the initiator either thermally decomposes or reacts with reducing agent and the resulting radicals react with dispersed monomer.

Additional quantities of the major monomers (referred to herein as incremental major monomer mixture feed) are added at a controlled rate throughout the polymerization in order to maintain a constant reactor pressure at a controlled temperature. The relative ratio of major monomers contained in the incremental major monomer mixture feed is set to be approximately the same as the desired ratio of copolymerized monomer units in the resulting fluoroelastomer. Thus, the incremental major monomer mixture feed contains between 20 and 70 weight percent, based on the total weight of the monomer mixture, of a first monomer of either TFE or $VF_2$ and 80 to 30 weight percent (total) of one or more additional major monomers that are different from the first monomer. Additional chain transfer agent may also, optionally, be continued to be added to the reactor at any point during this stage of the polymerization. Additional fluorosurfactant and polymerization initiator may also be fed to the reactor during this stage. The amount of polymer formed is approximately equal to the cumulative amount of incremental major monomer mixture feed. One skilled in the art will recognize that the molar ratio of monomers in the incremental major monomer mixture feed is not necessarily exactly the same as that of the desired copolymerized monomer unit composition in the resulting fluoroelastomer because the composition of the initial charge may not be exactly that required for the desired final fluoroelastomer composition, or because a portion of the monomers in the incremental major monomer mixture feed may dissolve into the polymer particles already formed, without reacting.

After 10% of the total amount of incremental major monomer mixture has been charged to the reactor, but prior to when 90% of the incremental major monomer mixture has been fed to the reactor, a stream of cure site monomer is begun to be fed to the reactor at a rate so as to result in the entire amount of cure site monomer being fed to the reactor by the time that 99% of the incremental major monomer mixture has been fed. Preferably, cure site monomer feed to the reactor is begun after 25% of the incremental major monomer mixture has been fed, most preferably, after 33% of the incremental major monomer mixture has been fed to the reactor.

If cure site monomer is begun to be introduced to the reactor prior to when 10% of incremental major monomer mixture has been fed, the polymerization rate will be severely retarded or completely quenched. If cure site monomer is begun to be added after 90% of the incremental major monomer mixture has been fed, the resulting fluoroelastomer will have poor heat resistance, indicating poor incorporation of cure site monomer along the growing polymer chains. Surprisingly, desirable fluoroelastomer may be produced when cure site monomer feed is started any time between when 10% and 90% of the total amount of incremental major monomer mixture has been fed to the reactor. Those skilled in the art would predict that cure site monomer should be added from the beginning of the reaction in order to obtain polymer having desirable properties.

Total polymerization times in the range of from 2 to 30 hours are typically employed in this semi-batch polymerization process.

The resulting fluoroelastomer dispersion may be isolated, filtered, washed and dried by conventional techniques employed in the fluoroelastomer manufacturing industry.

Peroxide curable fluoroelastomer compositions of this invention comprise a) a fluoroelastomer of this invention (as defined above), b) an organic peroxide, and c) a coagent. Preferably, the compositions also contain an acid acceptor such as a divalent metal hydroxide, a divalent metal oxide, a strongly basic (i.e. pka>10) organic amine such as ProtonSponge® (available from Aldrich), or a combination of any of the latter. Examples of divalent metal oxides and hydroxides include CaO, $Ca(OH)_2$ and MgO.

Organic peroxides suitable for use include, but are not limited to 1,1-bis(t-butylperoxy)-3,5,5-trimethylcyclohexane; 1,1-bis(t-butylperoxy)cyclohexane; 2,2-bis(t-butylperoxy)octane; n-butyl-4,4-bis(t-butylperoxy)valerate; 2,2-bis(t-butylperoxy)butane; 2,5-dimethylhexane-2,5-dihydroxyperoxide; di-t-butyl peroxide; t-butylcumyl peroxide; dicumyl peroxide; alpha, alpha'-bis(t-butylperoxy-m-isopropyl)benzene; 2,5-dimethyl-2,5-di(t-butylperoxy)hexane; 2,5-dimethyl-2,5-di(t-butylperoxy)hexene-3; benzoyl peroxide, t-butylperoxybenzene; 2,5-dimethyl-2,5-di(benzoylperoxy)-hexane; t-butylperoxymaleic acid; and t-butylperoxyisopropylcarbonate. Preferred examples of organic peroxides include 2,5-dimethyl-2,5-di(t-butylperoxy)hexane, dicumyl peroxide, and alpha, alpha'-bis(t-butylperoxy-m-isopropyl)benzene. The amount compounded is generally in the range of 0.05–5 parts by weight, preferably in the range of 0.1–3 parts by weight per 100 parts by weight of the fluoroelastomer. This particular range is selected because if the peroxide is present in an amount of less than 0.05 parts by weight, the vulcanization rate is insufficient and causes poor mold release. On the other hand, if the peroxide is present in amounts of greater than 5 parts by weight, the compression set of the cured polymer becomes unacceptably high. In addition, the organic peroxides may be used singly or in combinations of two or more types.

Coagents employed in the curable compositions of this invention are polyfunctional unsaturated compounds such as triallyl cyanurate, trimethacryl isocyanurate, triallyl isocyanurate, trimethallyl isocyanurate, triacryl formal, triallyl trimellitate, N,N'-m-phenylene bismaleimide, diallyl phthalate, tetraallylterephthalamide, tri(diallylamine)-s-triazine, triallyl phosphite, bis-olefins and N,N-diallylacrylamide. The amount compounded is generally in the range of 0.1–10 parts by weight per 100 parts by weight of the fluoroelastomer. This particular concentration range is selected because if the coagent is present in amounts less than 0.1 part by weight, crosslink density of the cured polymer is unacceptable. On the other hand, if the coagent is present in amounts above 10 parts by weight, it blooms to the surface during molding, resulting in poor mold release characteristics. The preferable range of coagent is 0.2–6 parts by weight per 100 parts fluoroelastomer. The unsaturated compounds may be used singly or as a combination of two or more types.

Optionally, other components, for example fillers such as carbon black, Austin black, graphite, thermoplastic fluoropolymer micropowders, silica, clay, diatomaceous earth, talc, wollastonite, calcium carbonate, calcium silicate, calcium fluoride, and barium sulfate; processing aides such as higher fatty acid esters, fatty acid calcium salts, fatty acidamides (e.g. erucamide), low molecular weight polyethylene, silicone oil, silicone grease, stearic acid, sodium stearate, calcium stearate, magnesium stearate, aluminum stearate, and zinc stearate; coloring agents such as titanium white and iron red may be used as compounding additives in the compositions of this invention. The amount of such filler is generally in the range of 0.1–100 parts by weight, preferably 1–60 parts by weight, per 100 parts by weight of the fluoroelastomer. This range is selected because if the filler is present in amounts of less than 0.1 part by weight, there is little or no effect, while, on the other hand, if greater than 100 parts by weight are used, elasticity is sacrificed. The amount of processing aid compounded is generally less than 10 parts by weight, preferably less than 5 parts by weight, per 100 parts by weight of the fluoroelastomer. If the amount used is above the limit, heat resistance is adversely affected. The amount of a coloring agent compounded is generally less than 50 parts by weight, preferably less than 30 parts by weight per 100 parts by weight of the fluoroelastomer. If greater than 50 parts by weight is used, compression set suffers.

The fluoroelastomer, organic peroxide, coagent, and any other ingredients are generally incorporated into the curable compositions of the invention by means of an internal mixer or rubber mill. The resulting composition may then be shaped (e.g. molded or extruded) and cured. Curing typically takes place at about 150°–200° C. for 1 to 60 minutes. Conventional rubber curing presses, molds, extruders, and the like provided with suitable heating and curing means can be used. Also, for optimum physical properties and dimensional stability, it is preferred to carry out a post curing operation wherein the molded or extruded article is heated in an oven or the like for an additional period of about 1–48 hours, typically from about 180°–275° C., generally in an air atmosphere.

The fluoroelastomers of this invention are useful in many industrial applications including seals, wire coatings, tubing and laminates.

EXAMPLES

Test Methods

Mooney viscosity, ML (1+10), was determined according to ASTM D1646 with an L (large) type rotor at 121° C. (unless otherwise noted), using a preheating time of one minute and rotor operation time of 10 minutes.

Inherent viscosities were measured at 30° C. Methyl ethyl ketone was employed as solvent (0.1 g polymer in 100 ml solvent) for fluoroelastomers that contained copolymerized units of vinylidene fluoride. A mixed solvent of 60/40/3 volume ratio of heptafluoro-2,2,3-trichlorobutane, perfluoro (α-butyltetrahydrofuran) and ethylene glycol dimethyl ether was used (0.2 g polymer in 100 ml solvent) for fluoroelastomers containing copolymerized units of tetrafluoroethylene and perfluoro(methyl vinyl ether).

Tensile Properties

The following physical property parameters were recorded; test methods are in parentheses:

$T_B$: tensile strength in units of MPa (ISO 37)

$E_B$: elongation at break in units of % (ISO 37)

$T_g$: glass transition temperature was measured by differential scanning calorimetry using a 10° C./minute heating rate.

Hardness (Shore A, ISO 868)

The invention is further illustrated by, but is not limited to, the following examples.

Example 1

A 40 liter reactor was charged with a solution containing 290 grams of ammonium perfluorooctanoate and 24,710 grams of water. The solution was heated to 80° C. After removal of trace oxygen, the reactor was then charged with 732 grams of a mixture of 52.7 wt. % vinylidene fluoride ($VF_2$), 42.4 wt. % perfluoro(methyl vinyl ether) (PMVE), and 4.9 wt. % tetrafluoroethylene (TFE), bringing reactor pressure to 1453 kPa. A 32.0 g mixture of 49.3 mol % 1,4-diiodoperfluorobutane, 34.8 mol % 1,6-diiodoperfluorohexane, 12.6 mol % 1,8-diiodoperfluorooctane, and 3.3 mol % 1,10-perfluorodecane was then charged to the reactor and the reactor was agitated for 60 minutes. The reactor was then charged with 50 ml of a buffered aqueous polymerization initiator solution containing 1 wt. % ammonium persulfate and 5 wt. % disodium phosphate. As reactor pressure dropped due to monomer consumption in the polymerization reaction, the reactor was fed with a mixture (incremental feed) of 54.7 wt. % $VF_2$, 34.8 wt. % PMVE and 10.5 wt. % TFE. Additional initiator solution was added to maintain polymerization rate. After 4000 grams of the latter monomer mixture had been fed, corresponding to 77 ml total initiator solution added, the liquid cure site monomer 4-iodo-3,3,4,4-tetrafluorobutene-1 (ITFB) was introduced to the reactor at a feed rate of 3.19 g ITFB per 1000 g monomer. After a total incremental feed of 8170 grams of major monomer had been introduced to the reactor, corresponding to 131 ml initiator solution and 13.3 g ITFB, both the monomer and initiator feeds were discontinued and the reactor was cooled. The resulting dispersion had a solids content of 25.2 wt. % and a pH of 5.3. The fluoroelastomer was isolated by acidification to pH 3 with sulfuric acid and coagulation with potassium alum solution. The crumb was filtered, washed with deionized water and dried. The resulting fluoroelastomer (Polymer 1) had an inherent viscosity of 0.99 dl/g, a ML (1+10) at 121° C. of 78 and contained 53.6 wt. % copolymerized units of $VF_2$, 33.3 wt. % PMVE, 13.0 wt. % TFE and 0.18 wt. % I. The number average molecular weight (Mn) was 185,600 as determined by size exclusion chromatography.

Example 2

125.0 g of Forafac® 1033D surfactant solution and 27.7 g of disodium phosphate heptahydrate were added to 24,847 g of deionized water. This was charged to a 40 liter reactor and the solution heated to 80° C. Trace oxygen was removed from the reactor. The reactor was then charged with 2275 g of a mixture of 28.1 wt. % tetrafluoroethylene (TFE) and 71.9 wt. % perfluoro(methyl vinyl ether) (PMVE). This brought the reactor pressure to 2101 kPa. Then 40.0 ml of a 1 wt. % ammonium persulfate/5% disodium phosphate heptahydrate aqueous initiator solution was charged to the reactor to initiate polymerization. As the reactor pressure dropped due to monomer consumption, the reactor was fed with a mixture of 51.8 wt. % TFE and 48.2 wt. % PMVE to maintain the reactor pressure at 2101 kPa. After 90 g of this monomer mixture had been fed, 23.6 g of a mixture of 49.3 mol % 1,4-diiodoperfluorobutane, 34.8 mol % 1,6-diiodoperfluorohexane, 12.6 mol % 1,8-diiodoperfluorooctane, and 3.3 mol % 1,10-diiodoperfluorodecane was charged to the reactor. Additional initiator solution was added to maintain polymerization rate. After 4170 g of the latter monomer mixture had been fed, corresponding to the addition of 3 ml of initiator solution, 4-iodo-3,3,4,4-tetrafluorobutene-1 (ITFB) was introduced to the reactor at a feed rate of 4.59 g ITFB per 1000 g monomer. After a total of 8333 g incremental major monomer had been fed, corresponding to a total of 112 ml initiator solution and 19.1 g ITFB, monomer and initiator feed was discontinued and the reactor was cooled.

The resulting latex had a solids content of 22.8% and a pH of 3.62. The latex was isolated by coagulation with aluminum sulfate solution. The crumb was filtered, washed 4 times with deionized water and dried. The resulting fluoroelastomer (Polymer 2) had an inherent viscosity of 0.31 dl/g, a ML(1+10) at 149° C. of 68 and contained 55.4 wt. % TFE, 44.5 wt. % PMVE and 0.22 wt. % I. The fluoroelastomer had a glass transition temperature of 2.9° C.

Example 3

110.0 g of Zonyl® FS-62 surfactant solution and 16.3 g of 20% sodium hydroxide solution were added to 27,373.7 g of deionized water. This was charged to a 40 liter reactor and the solution heated to 80° C. Trace oxygen was removed from the reactor. The reactor was then charged with 948 g of a mixture of 25.0 wt. % vinylidene fluoride, 72.8 wt. % hexafluoropropylene (HFP), and 2.2 wt. % tetrafluoroethylene to a pressure of 1618 kPa. Then 90.0 ml of a 1 wt. % ammonium persulfate initiator aqueous solution was charged to the reactor to initiate polymerization. As the reactor pressure dropped due to monomer consumption, the reactor was fed with a mixture of 50.0 wt. % $VF_2$, 30.0 wt. % HFP, and 20.0 wt. % TFE to maintain the reactor pressure at 1618 kPa. After 90 g of monomer had been fed to the reactor, 38.7 g of a mixture of 49.3 mol % 1,4-diiodoperfluorobutane, 34.8 mol % 1,6-diiodoperfluorohexane, 12.6 mol % 1,8-diiodoperfluorooctane, and 3.3 mol % 1,10-diiodoperfluorodecane was charged to the reactor. Additional initiator solution was added to maintain polymerization rate. After 4625 g of the latter monomer mixture had been fed, corresponding to the addition of 62 ml of additional initiator solution, 4-iodo-3,3,4,4-tetrafluorobutene-1 (ITFB) was introduced to the reactor at a feed rate of 3.20 g ITFB per 1000 g monomer. After a total of 9250 g monomer had been fed, corresponding to a total of 194 ml initiator solution and 14.80 g ITFB, monomer and initiator feeds were discontinued and the reactor was cooled. The resulting latex had a solids content of 26.48% and a pH of 2.68. The latex was isolated by coagulation with aluminum sulfate solution. The crumb was filtered, washed 4 times with deionized water and dried. The resulting fluoroelastomer (Polymer 3) had an inherent viscosity of 0.43 dl/g, a ML (1+10) 121° C. of 50 and contained 49.8 wt. % $VF_2$, 19.5 wt. % TFE, 30.5 wt. % HFP and 0.20 wt. % I. The fluoroelastomer had a Tg of −17° C.

Control Example A 313.2 g of ammonium perfluorooctanoate surfactant solution were added to 24,686.6 g of deionized water. This was charged to a 40 liter reactor and the solution heated to 80° C. Trace oxygen was removed from the reactor. Then 32.0 g of a mixture of 49.3 mol % 1,4-diiodoperfluorobutane, 34.8 mol % 1,6-diiodoperfluorohexane, 12.6 mol % 1,8-diiodoperfluorooctane, and 3.3 mol % 1,10-diiodoperfluorodecane was charged to the reactor. The reactor was agitated for 15 minutes. The reactor was then charged with 650 g of a mixture of 43.0 wt. % $VF_2$, 50.0 wt. % PMVE, and 7.0 wt. % TFE to a pressure of 1280 kPa. Then 40.0 ml of a 1 wt. % ammonium persulfate/5 wt. % disodium phosphate heptahydrate initiator aqueous solution was charged to the reactor to initiate polymerization. As the reactor pressure dropped due to monomer consumption, the reactor was fed with a mixture of 55.0 wt. % $VF_2$, 35.0 wt. % PMVE, and 10.0 wt. % TFE to maintain the reactor pressure at 1280 kPa. Additional initiator solution was added to maintain polymerization rate. After a total of 8170 g monomer had been fed, corresponding to a total of 101 ml initiator solution, monomer and initiator feeds were discontinued and the reactor was cooled. The resulting latex had a solids content of 26.17% and a pH of 3.96. The latex was isolated by coagulation with potassium aluminum sulfate solution. The crumb was filtered, washed 4 times with deionized water and dried. The resulting fluoroelastomer (Control Polymer A) had an inherent viscosity of 0.83 dl/g, a ML(1+10) 121° C. of 64 and contained 54.0 wt. % VF2, 11.8 wt. % TFE, 34.1 wt. % HFP and 0.12 wt. % I. The fluoroelastomer had a Tg of −29° C.

Example 4

313.2 g of ammonium perfluorooctanoate surfactant solution were added to 24,686.6 g of deionized water. This was charged to a 40 liter reactor and the solution heated to 80° C. Trace oxygen was removed from the reactor. Then 32.0 g of a mixture of 49.3 mol % 1,4-diiodoperfluorobutane, 34.8 mol % 1,6-diiodoperfluorohexane, 12.6 mol % 1,8-diiodoperfluorooctane, and 3.3 mol % 1,10-diiodoperfluorodecane was charged to the reactor. The reactor was agitated for 60 minutes. The reactor was charged with 732 g of a mixture of 42.2 wt. % $VF_2$, 52.8 wt. % PMVE, and 5.0 wt. % TFE to a pressure of 1452 kPa. Then 50.0 ml of a 1 wt. % ammonium persulfate/5 wt. % disodium phosphate heptahydrate aqueous initiator solution was charged to the reactor to initiate polymerization. As the reactor pressure dropped due to monomer consumption, the reactor was fed with a mixture of 55.0 wt. % $VF_2$, 35.0 wt. % PMVE, and 10.0 wt. % TFE to maintain the reactor pressure at 1452 kPa. Additional initiator solution was added to maintain polymerization rate. After 6085 g of this monomer mixture had been fed, corresponding to the addition of 59 ml of additional initiator solution, 4-iodo-3,3,4,4-tetrafluorobutene-1 (ITFB) was introduced to the reactor at a feed rate of 6.38 g ITFB per 1000 g monomer. After a total of 8170 g monomer had been fed, corresponding to a total of 169 ml initiator solution, monomer and initiator feeds were discontinued and the reactor was cooled. The resulting latex had a solids content of 25.56% and a pH of 6.8. The latex was isolated by coagulation with potassium aluminum sulfate solution. The crumb was filtered, washed 4 times with deionized water and dried. The resulting fluoroelastomer (Polymer 4) had an inherent viscosity of 0.88 dl/g, a ML (1+10) 121° C. of 66 and contained 52.8 wt. % $VF_2$, 14.4 wt. % TFE, 32.7 wt. % HFP and 0.20 wt. % I. The fluoroelastomer had a Tg of −29° C.

Example 5

A curable composition of the invention (Sample 1) was made by mixing a fluoroelastomer of the invention prepared in Example 4 above (Polymer 4) with an organic peroxide, coagent and other ingredients on a conventional two-roll rubber mill, using standard mixing techniques employed in the elastomer industry. A comparative curable composition (Comparative Sample A) was made by the same procedure except that a fluoroelastomer of the prior art (Control Polymer A prepared above), not containing ITFB cure site monomer units was used. The formulations are shown in Table I.

The compositions were molded into slabs and press cured at 177° C. for 7 minutes, followed by post curing at 232° C. for 15 hours. Tensile properties were measured according to the Test Methods and are also shown in Table I. The slabs were then aged at 275° C. in an air oven for 70 hours. The tensile properties of the aged slabs are shown in Table I. The curable composition of the invention (Sample 1) that contains a fluoroelastomer of the invention having ITFB cure site monomer retained its tensile strength much better than the comparative composition whose fluoroelastomer lacked ITFB.

TABLE I

| Ingredient, phr[1] | Sample 1 | Comp. Sample A |
|---|---|---|
| Polymer 4 | 100 | 0 |
| Control Polymer A | 0 | 100 |
| N990 Carbon Black | 30 | 30 |
| Triallyl isocyanurate | 3.0 | 3.0 |
| Luperco 101XL[2] | 3.0 | 3.0 |
| ZnO | 3.0 | 3.0 |
| Tensile Properties: | | |
| Tensile Strength, MPa | 18.0 | 18.2 |
| Elongation at Break, % | 270 | 345 |
| Hardness, Shore A pts | 69 | 69 |
| % Change in Tensile Properties After Heat Aging: | | |
| Tensile Strength | −22 | −39 |
| Elongation at Break | +26 | +22 |
| Hardness, Shore A | −1.5 | −1.5 |

[1]parts by weight per hundred parts rubber (i.e. fluoroelastomer)
[2]45 wt. % 2,5-dimethyl-2,5-di-(t-butylperoxy)hexane on an inert filler (available from Atofina)

What is claimed is:

1. A semibatch polymerization process for the manufacture of a fluoroelastomer comprising:

(A) charging a reactor with a quantity of an aqueous solution comprising a surfactant;

(B) feeding to said reactor a quantity of an initial major monomer mixture to form a reaction medium, said initial major monomer mixture comprising i) from 10 to 70 weight percent, based on total weight of said monomer mixture, of a first monomer, said first monomer selected from the group consisting of vinylidene fluoride and tetrafluoroethylene, and ii) between 75 and 30 weight percent, based on total weight of said monomer mixture, of one or more additional copolymerizable monomers, different from said first monomer, wherein said additional monomer is selected from the group consisting of fluorine-containing olefins, fluorine-containing ethers, and mixtures thereof;

(C) polymerizing said monomers in the presence of a free radical initiator to form a fluoroelastomer dispersion while maintaining said reaction medium at a pH between 1 and 7, at a pressure between 0.5 and 10 MPa, and at a temperature between 25° C. and 130° C.; and (D) feeding to said reactor a quantity of an incremental major monomer mixture to maintain constant pressure in said reactor, said incremental major monomer mixture comprising i) from 20 to 70 weight percent, based on total weight of said monomer mixture, of a first monomer, said first monomer selected from the group consisting of vinylidene fluoride and tetrafluoroethylene, and ii) between 80 and 30 weight percent, based on total weight of said monomer mixture, of one or more additional copolymerizable monomers, different from said first monomer, wherein said additional monomer is selected from the group consisting of fluorine-containing olefins, fluorine-containing ethers, and mixtures thereof; wherein, at a time between when 0% and 50% of said quantity of incremental major monomer mixture has been fed to said reactor, addition of a quantity of a chain transfer agent to said reactor is begun, said chain transfer agent having a formula $RI_x$, where R is a perfluoroalkyl group containing 3 to 10 carbon atoms and x is 1 or 2, and wherein at a time between when 10% and 90% of said quantity of incremental major monomer mixture has been fed to said reactor, addition of a quantity of a cure site monomer to said reactor is begun, said cure site monomer having the general formula $CH_2$=CH—$(CF_2)_n$I, where n is an integer between 2 and 8.

2. A semibatch polymerization process of claim 1 wherein addition of a quantity of said chain transfer agent to said reactor is begun prior to when 20% of said quantity of incremental major monomer mixture has been fed to said reactor.

3. A semibatch polymerization process of claim 2 wherein addition of a quantity of said chain transfer agent to said reactor is begun prior to when 5% of said quantity of incremental major monomer mixture has been fed to said reactor.

4. A semibatch polymerization process of claim 1 wherein addition of a quantity of said cure site monomer to said reactor is begun after 25% of said quantity of incremental major monomer mixture has been fed to said reactor.

5. A semibatch polymerization process of claim 4 wherein addition of a quantity of said cure site monomer to said reactor is begun after 33% of said quantity of incremental major monomer mixture has been fed to said reactor.

6. A semibatch polymerization process of claim 1 wherein said cure site monomer is 4-iodo-3,3,4,4-tetrafluorobutene-1.

7. A semibatch polymerization process of claim 1 wherein said chain transfer agent is of formula $RI_2$, where R is a perfluoroalkyl group containing 3 to 10 carbon atoms.

* * * * *